(12) United States Patent
Tamura et al.

(10) Patent No.: US 10,256,041 B2
(45) Date of Patent: Apr. 9, 2019

(54) POLYPROPYLENE FOR FILM CAPACITOR, BIAXIALLY STRETCHED FILM FOR FILM CAPACITOR, FILM CAPACITOR, AND PROCESS FOR PRODUCING THE SAME

(71) Applicant: PRIME POLYMER CO., LTD., Tokyo (JP)

(72) Inventors: Satoshi Tamura, Ichihara (JP); Jun Birukawa, Ichihara (JP); Hiroki Shimizu, Ichihara (JP)

(73) Assignee: PRIME POLYMER CO., LTD., Tokyo (JP)

( * ) Notice: Subject to any disclaimer, the term of this patent is extended or adjusted under 35 U.S.C. 154(b) by 0 days.

(21) Appl. No.: 15/562,796

(22) PCT Filed: Mar. 30, 2016

(86) PCT No.: PCT/JP2016/060304
§ 371 (c)(1),
(2) Date: Sep. 28, 2017

(87) PCT Pub. No.: WO2016/159044
PCT Pub. Date: Oct. 6, 2016

(65) Prior Publication Data
US 2018/0286588 A1    Oct. 4, 2018

(30) Foreign Application Priority Data
Mar. 31, 2015   (JP) .................................. 2015-073210

(51) Int. Cl.
| | | |
|---|---|---|
| *H01G 4/18* | (2006.01) | |
| *C08J 5/18* | (2006.01) | |
| *C08K 5/156* | (2006.01) | |
| *C08L 23/12* | (2006.01) | |
| *C08F 110/06* | (2006.01) | |
| *C08K 5/1575* | (2006.01) | |
| *H01G 4/33* | (2006.01) | |
| *C08J 3/20* | (2006.01) | |
| *C08K 5/053* | (2006.01) | |
| *B29C 47/00* | (2006.01) | |
| *B29C 55/14* | (2006.01) | |
| *B29K 23/00* | (2006.01) | |
| *B29L 31/34* | (2006.01) | |

(52) U.S. Cl.
CPC ............. *H01G 4/18* (2013.01); *C08F 110/06* (2013.01); *C08J 3/201* (2013.01); *C08J 5/18* (2013.01); *C08K 5/053* (2013.01); *C08K 5/156* (2013.01); *C08K 5/1575* (2013.01); *C08L 23/12* (2013.01); *H01G 4/33* (2013.01); *B29C 47/0021* (2013.01); *B29C 47/0057* (2013.01); *B29C 55/143* (2013.01); *B29K 2023/12* (2013.01); *B29K 2995/0053* (2013.01); *B29L 2031/3406* (2013.01)

(58) Field of Classification Search
CPC . C08L 23/12; H01G 4/18; H01G 4/33; C08K 5/156; C08J 5/18; C08J 5/053; C08J 5/1575; C08F 110/06; B29C 47/0021; B29C 47/0057; B29C 55/143; B29C 3023/12; B29C 2995/0053; B29C 2031/3406
USPC .......................................................... 526/72
See application file for complete search history.

(56) References Cited

U.S. PATENT DOCUMENTS

| | | | |
|---|---|---|---|
| 4,971,937 A | 11/1990 | Albizzati et al. | |
| 4,978,648 A | 12/1990 | Barbe et al. | |
| 5,724,222 A * | 3/1998 | Hirano ...................... | C08J 5/18 252/567 |
| 6,094,337 A * | 7/2000 | Ueda ......................... | C08J 5/18 361/311 |
| 6,562,886 B1 | 5/2003 | Yutaka et al. | |
| 8,288,495 B2 * | 10/2012 | Tamura ................. | C08F 110/06 526/348.1 |
| 9,449,761 B2 * | 9/2016 | Tan ......................... | H01G 4/18 |
| 2005/0202958 A1 | 9/2005 | Yoshikiyo et al. | |
| 2005/0239926 A1 | 10/2005 | Xie et al. | |
| 2005/0239928 A1 | 10/2005 | Xie et al. | |
| 2007/0299256 A1 | 12/2007 | Xie | |
| 2008/0097050 A1 | 4/2008 | Matsunaga et al. | |

(Continued)

FOREIGN PATENT DOCUMENTS

| | | |
|---|---|---|
| EP | 1006149 A1 | 6/2000 |
| JP | S59-191207 A | 10/1984 |

(Continued)

OTHER PUBLICATIONS

Korean Office Action dated May 28, 2018 in corresponding application No. 10-2017-7029453.

(Continued)

*Primary Examiner* — William K Cheung
(74) *Attorney, Agent, or Firm* — Foley & Lardner LLP

(57) ABSTRACT

A polypropylene (F) for film condensers having the following requirements: (1) an MFR (JIS K 7210, 230° C., 2.16 kg load) in the range of 1-10 (g/10 min), (2) an mmmm fraction that is at least 93%, (3) a <2,1>erythro position defect amount as measured using $^{13}$C-NMR that is less than 0.1 mol %, (4) ash content obtained by complete combustion in atmosphere that is at most 50 ppm, (5) chlorine content as measured by ion chromatography that is at most 5 ppm; and (6) is obtained by including a propylene homopolymer for which Mw/Mn as measured via GPC is 6.5-12 and an α-crystal nucleating agent with a melting point of at most 290° C.

8 Claims, No Drawings

(56) References Cited

U.S. PATENT DOCUMENTS

| | | |
|---|---|---|
| 2008/0125555 A1 | 5/2008 | Matsunaga et al. |
| 2008/0306228 A1 | 12/2008 | Matsunaga et al. |
| 2009/0069515 A1 | 3/2009 | Matsunaga et al. |
| 2009/0203855 A1 | 8/2009 | Matsunaga et al. |
| 2012/0010318 A1 | 1/2012 | Tan et al. |
| 2013/0303684 A1 | 11/2013 | Gloger et al. |

FOREIGN PATENT DOCUMENTS

| | | |
|---|---|---|
| JP | S61-110906 | 5/1986 |
| JP | H04-218507 | 8/1992 |
| JP | H07-145212 | 6/1995 |
| JP | H08-290536 | 11/1996 |
| JP | 2723137 | 3/1998 |
| JP | 2774160 | 7/1998 |
| JP | 2776914 | 7/1998 |
| JP | 2001-310948 | 11/2001 |
| JP | 2009-057473 | 3/2009 |
| JP | 2009-120821 | 6/2009 |
| JP | 2010-219328 | 9/2010 |
| JP | 2010-219329 | 9/2010 |
| JP | 2011-256278 | 12/2011 |
| JP | 5586784 | 9/2014 |
| JP | 2015-000960 | 1/2015 |
| KR | 20140129264 A | 11/2014 |
| WO | WO-2004/016662 | 2/2004 |
| WO | WO-2005/111134 | 11/2005 |
| WO | WO-2006/077945 | 7/2006 |
| WO | WO-2008/010459 | 1/2008 |
| WO | WO-2010/107052 | 9/2010 |
| WO | WO-2013/127707 A1 | 9/2013 |

OTHER PUBLICATIONS

A. Zambelli, et al., "Model Compounds and $^{13}C$ NMR Observation of Stereosequences of Polypropylene," Macromolecules, (Sep.-Oct. 1975), V. 8 No. 5, pp. 687-689.

Balzano, et al., "Thermoreversible DMDBS Phase Separation in iPP: The Effects of Flow on the Morphology," Macromolecules, (Jul. 2008), V. 41, No. 14, pp. 5350-5355.

Carman, et al., "Monomer Sequence Distribution in Ethylene Propylene Elastomers. I. Measurement by Carbon-13 Nuclear Magnetic Resonance Spectroscopy," Rubber Chemistry and Technology, (Jun. 1971), V. 44, No. 3, pp. 781-804.

Kristiansen, et al., "Mechanical Properties of Sorbitol-Clarified Isotactic Polypropylene: Influence of Additive Concentration on Polymer Structure and Yield Behavior," Macromolecules, (Dec. 2005), V. 38, No. 25, pp. 10461-10465.

International Search Report issued in International Patent Application No. PCT/JP2016/060304 dated Apr. 26, 2016.

Extended European Search Report dated Nov. 2, 2018 in corresponding application No. 16772925.0.

Japanese Patent Office, "Notification of Reasons for Refusal," issued in connection with Japanese Patent Application No. 2017-510076, dated Feb. 5, 2019.

* cited by examiner

POLYPROPYLENE FOR FILM CAPACITOR, BIAXIALLY STRETCHED FILM FOR FILM CAPACITOR, FILM CAPACITOR, AND PROCESS FOR PRODUCING THE SAME

RELATED APPLICATIONS

This application is a national stage application under 35 U.S.C. § 371 of International Patent Application No. PCT/JP2016/060304, filed Mar. 30, 2016, which claims priority to Japanese Patent Application No. 2015-073210, filed Mar. 31, 2015, the disclosures of which are hereby incorporated by reference in their entireties.

TECHNICAL FIELD

The present invention relates to a polypropylene for a film capacitor, a biaxially stretched film for a film capacitor, a film capacitor, and a process for producing the same. In detail, the present invention relates to a polypropylene for a film capacitor that exhibits excellent stretchability and uniformity when stretched, which is suitable for a biaxially stretched film for a film capacitor that has a high breakdown voltage (BDV) and a small thermal shrinkage ratio, and a film capacitor comprising the biaxially stretched film for a film capacitor.

BACKGROUND ART

Polypropylene, which has excellent stretching characteristics, insulation property, and voltage resistance, has been widely used for a film for a film capacitor. With the demand for film capacitors increasing mainly in the fields of automobiles, home electrical appliances, and the like, in order to meet the demand for further size reduction, high reliability, and cost reduction, films used therefor have been demanded to have a further improved breakdown voltage. In general, when there is a difference of about 10% in BDV, it is regarded as a significant difference.

As a film for a film capacitor, for example, Patent Document 1 discloses a film comprising a composition mainly composed of a high stereoregularity polypropylene.

However, none of polypropylenes with improved stereoregularity has been able to provide a film having a sufficient breakdown voltage, and in particular, a high breakdown voltage in a harsh environment with a high temperature and a high frequency current, and thus a capacitor satisfying the market demand has not been provided. In recent years, with progress in practical realization of high efficiency mainly especially for power converters by, for example, increasing the frequency of switching elements or driving them at high temperatures, a demand for parts that can be applied for realization of high reliability, size reduction, and cost reduction has been increasing.

Patent Document 2 describes a polypropylene composition comprising polypropylene and an α crystal nucleating agent, which can be used for a capacitor film. However, since the proportion of <2,1> erythro regio defects measured using $^{13}$C-NMR is as high as 0.1% by mol for the polypropylene described in Patent Document 2, a film having high a BDV especially at a high temperature cannot be obtained using the polypropylene because of its low melting point, etc. In addition, it is impossible to provide a film having a high breakdown voltage even in a harsh environment with a high frequency current by using the polypropylene because it is difficult to produce a film having preferable thickness accuracy. Accordingly, a high quality capacitor film cannot be provided. Patent Document 2 merely discloses, as an object of the invention, the improvement of fluctuation between capacitor film samples (i parameters), and therefore, it fails to teach or suggest the improvement of BDV. Further, it is impossible to achieve excellent stretchability and uniformity in stretching with the polypropylene disclosed in Patent Document 2.

Patent Document 3 describes an original sheet or film having a high β crystal fraction, which can be used for a capacitor film. However, even with the use of the film, it is impossible to provide a film having excellent stretchability and a sufficient breakdown voltage because it has, for example, a narrow range of temperatures available for stretching, thereby making impossible to provide a high-quality capacitor film.

DOCUMENTS OF RELATED ART

Patent Documents

Patent Document 1: JP S61-110906 A
Patent Document 2: JP 5586784 B
Patent Document 3: JP 2009-57473 A

SUMMARY OF THE INVENTION

Problems to be Solved by the Invention

The present invention has been made in order to solve the conventional techniques described above. It is an object of the present invention to provide a polypropylene for a film capacitor having excellent stretchability and uniformity when stretched (also herein referred to as "polypropylene (F)"), which is preferable for a biaxially stretched film for a film capacitor that has a small thermal shrinkage ratio and a sufficient breakdown voltage even in a harsh environment especially with a high temperature and a high frequency current, a film capacitor comprising the biaxially stretched film for a film capacitor (also herein referred to as "biaxially stretched film"), and a process for producing the same.

Means for Solving the Problem

The present inventors made earnest study in order to solve the problem described above, and found out that a polypropylene for a film capacitor, which comprises at least a specific propylene homopolymer and an α crystal nucleating agent having a specific melting point, has excellent stretchability and uniformity when stretching a film, and a biaxially stretched film for a film capacitor that is obtained by biaxially stretching the polypropylene for a film capacitor has a sufficient breakdown voltage, and in particular, a high breakdown voltage at a high temperature, and a small thermal shrinkage ratio, which is preferable for a film capacitor. The present invention has been completed based on the findings. The present inventors further found that a film capacitor comprising a biaxially stretched film can maintain sufficient quality even when used in a harsh environment with a high temperature and a high frequency current. The present invention has been completed also based on the finding.

In other words, the present invention includes the following.

The polypropylene for a film capacitor of the present invention comprises a propylene homopolymer and an α crystal nucleating agent having a melting point of not more than 290° C., wherein the propylene homopolymer satisfies at least that: (1) the melt flow rate (MFR) is within a range of 1 to 10 (g/10 min), as determined at 230° C. under a load of 2.16 kg in accordance with JIS K 7210; (2) the isotactic pentad fraction (mmmm fraction) is not less than 93%, as determined using $^{13}$C-NMR; (3) the proportion of <2,1> erythro regio defects is less than 0.1% by mol, as determined using $^{13}$C-NMR; (4) the ash amount is not more than 50 ppm, as obtained by completely burning the propylene homopolymer in the air; (5) the chlorine amount is not more than 5 ppm, as determined by ion chromatography; and (6) the molecular weight distribution Mw/Mn is 6.5 to 12, as measured by gel permeation chromatography (GPC).

Preferably, polypropylene (F) is obtained by melt-kneading at least the propylene homopolymer and the α crystal nucleating agent.

The process for producing a polypropylene for a film capacitor of the present invention comprises melt-kneading at least the propylene homopolymer and the α crystal nucleating agent.

Preferably, the α crystal nucleating agent is at least one member selected from a nonitol derivative and a sorbitol derivative.

Preferably, the amount of the α crystal nucleating agent is 1 to 2000 ppm based on 100% by weight of the propylene homopolymer.

The biaxially stretched film for a film capacitor of the present invention is obtained by biaxially stretching the polypropylene (F) of the present invention.

The process for producing a biaxially stretched film for a film capacitor of the present invention comprises biaxially stretching the polypropylene (F) of the present invention.

The film capacitor of the present invention comprises the biaxially stretched film of the present invention.

Effect of the Invention

According to the present invention, a biaxially stretched film for a film capacitor, which is a thin film that has no granular defects or separation voids as the range of temperatures available for stretching is widely and uniformly extended and has sufficient a breakdown voltage, and in particular, a high breakdown voltage even when used at a high temperature, and a small thermal shrinkage ratio, can be obtained. Therefore, a film capacitor comprising the biaxially stretched film can show its performance sufficient for the use in a small-sized capacitor with large capacity and maintain sufficient quality even when used in a harsh environment with a high temperature and a high frequency current, which can greatly contribute, for example, to allowing hybrid automobiles to have higher output, smaller size, and lighter weight.

DETAILED DESCRIPTION OF THE INVENTION

Hereinafter, the present invention will be described in detail.

[Propylene Homopolymer]

A propylene homopolymer used as raw material for the polypropylene (F) for a film capacitor of the present invention satisfies the following requirements (1) to (6). When the propylene homopolymer satisfies the following requirements (1) to (7), the moldability is good and the withstand voltage is further improved, which is more preferable.

(1) The melt flow rate (MFR) is within a range of 1 to 10 (g/10 min), preferably 1.5 to 5 (g/10 min), and more preferably 2 to 5 (g/10 min), as determined at 230° C. under a load of 2.16 kg in accordance with JIS K 7210. The MFR of less than 1 g/10 min may make it impossible to extrude and the film-moldability inferior and make stretching uneasy, and the MFR of more than 10 g/10 min may cause the film to break in stretching, which is thus not preferred. This is presumably due to insufficient melt tension.

(2) The isotactic pentad fraction (mmmm fraction) is not less than 93%, preferably not less than 94%, more preferably not less than 96%, and furthermore preferably not less than 98%, as determined using $^{13}$C-NMR. The propylene homopolymer with an isotactic pentad fraction (mmmm fraction) of less than 93% cannot provide a biaxially stretched film having a high breakdown voltage and a film capacitor comprising the film. This is presumed to be because the polypropylene homopolymer with a low isotactic pentad fraction has a large number of amorphous portions, which easily conduct electricity. The upper limit of the isotactic pentad fraction, although not particularly limited, is usually not more than 99.9% and preferably not more than 99.5%.

The isotactic pentad fraction (mmmm fraction), a value defined on the basis of assignment shown in Macromolecules, 8, 687 (1975) by A. zambelli et al., indicates the ratio of isotactic chains in a pentad unit in the molecular chain, as measured using $^{13}$C-NMR, and is calculated as follows: the isotactic pentad fraction=(the area of peaks at 21.7 ppm)/(the area of peaks at 19 to 23 ppm).

(3) The proportion of <2,1> erythro regio defects is usually less than 0.1% by mol, preferably not more than 0.05% by mol, and more preferably not more than 0.02% by mol, as determined using $^{13}$C-NMR. The lower limit is preferably 0% by mol, at which there are no <2,1> erythro regio defects. When it walls within such range, it is possible to provide a biaxially stretched film that has a high breakdown voltage even in a harsh environment especially with a high temperature and a high frequency current. The propylene homopolymer according to the present invention has a small amount of propylene inserted to incorrect sites in the polymer chain, and thus, it is preferably compatible with a specific α crystal nucleating agent described below. Therefore, fine spherocrystals tend to be generated in the polymer chain, thereby improving stretchability and uniformity when stretching a film. Further, it is presumed that a portion susceptible to breakdown in the polymer is reduced, which can improve breakdown voltage, and in particular, breakdown voltage at a high temperature, of the resulting biaxially stretched film.

(4) The ash amount is not more than 50 ppm, preferably not more than 30 ppm, and more preferably not more than 25 ppm, and furthermore preferably not more than 20 ppm, as obtained by completely burning the propylene homopolymer in the air. The propylene homopolymer that will have an ash amount of more than 50 ppm cannot provide a polypropylene film for a film capacitor having a high breakdown voltage. This is presumably because the propylene homopolymer that will have a large ash amount tends to generate voids, which influences the breakdown withstand voltage.

(5) The chlorine amount is not more than 5 ppm, preferably not more than 3 ppm, and more preferably not more than 2 ppm, as determined by ion chromatography. The propylene homopolymer having a chlorine amount of more than 5 ppm cannot provide a biaxially stretched film having a high breakdown voltage. This is presumably because the chlorine, which is converted to hydrochloric acid, gradually breaks the polypropylene, which influences the breakdown withstand voltage when the polypropylene film for a film capacitor is used for a long term.

The propylene homopolymers with less ash amounts and less chlorine amounts in impurities are presumed to have less influence on the breakdown withstand voltage.

(6) The molecular weight distribution Mw/Mn (Mw: weight-average molecular weight, Mn: number-average molecular weight) is usually 6.5 to 12, preferably 7.0 to 12, more preferably more than 7.0 to 11.5, as measured by gel permeation chromatography (GPC). It is furthermore preferably 8.0 to 10 because a polypropylene film for a film capacitor having a higher breakdown voltage at a higher temperature and a small thermal shrinkage ratio can be obtained for the reason that, for example, a film having preferable thickness accuracy can be formed. When the molecular weight distribution Mw/Mn is less than 6.5, there are few high-molecular-weight components, an initial increase in stretching stress is small in stretching, which might make it impossible to provide a film with good thickness accuracy. In addition, when the molecular weight distribution Mw/Mn exceeds 12, the viscosity inside the resin significantly fluctuates, which might cause breakage in stretching. If the molecular weight distribution Mw/Mn is within the above range, the film formability and stretchability are excellent, which is thus preferable.

(7) The melting point (Tm) is not lower than 155° C., preferably not lower than 160° C., and more preferably not lower than 162° C., as measured by differential scanning calorimetry (DSC). The upper limit of Tm, although not particularly limited, is usually not higher than 170° C. The propylene homopolymer with Tm falling within the above range provides a biaxially stretched film excellent in properties such as heat resistance shrinkage and breakdown withstand voltage. This is presumably because of having a small number of amorphous portions, which can move freely.

[Method for Producing Propylene Homopolymer]

The process for producing a propylene homopolymer of the present invention is not restricted at all as long as the propylene homopolymer satisfies the requirements (1) to (6) and preferably further satisfies the requirements (1) to (7), but in usual, a process in which propylene is polymerized in the presence of an olefin polymerization catalyst containing a solid titanium catalyst component is preferably used. Examples of the solid titanium catalyst component include (I) a solid titanium catalyst component containing magnesium, titanium, halogen, and an electron donor, (II) an organometallic compound catalyst component, (III) a catalyst component containing an organosilicon compound represented by an alkoxysilane or an electron donor represented by a specific polyether compound.

The solid titanium catalyst component (I) can be prepared by bringing a magnesium compound (a-1), a titanium compound (a-2), and an electron donor (a-3) into contact with one another. Examples of the magnesium compounds (a-1) include magnesium compounds having reducing ability, such as a magnesium compound having a magnesium-carbon bond or a magnesium-hydrogen bond, and magnesium compounds having no reducing ability, such as magnesium halide, alkoxymagnesium halide, allyloxymagnesium halide, alkoxymagnesium, allyloxymagnesium, and carboxylate of magnesium.

In the preparation of the solid titanium catalyst component (I), it is preferable to use, for example, a tetravalent titanium compound represented by the following formula (3) as the titanium compound (a-2).

$$Ti(OR^6)_g X^1_{4-g} \quad (3)$$

(In the formula (3), $R^6$ is a hydrocarbon group, $X^1$ is a halogen atom, and $0 \leq g \leq 4$.)

Specific examples include: titanium tetrahalide such as $TiCl_4$, $TiBr_4$, or $TiI_4$; tri-halogenated alkoxy titanium such as $Ti(OCH_3)Cl_3$, $Ti(OC_2H_5)Cl_3$, $Ti(O-n-C_4H_9)Cl_3$, $Ti(OC_2H_5)Br_3$, or $Ti(O-iso-C_4H_9)Br_3$; di-halogenated dialkoxy titanium such as $Ti(OCH_3)_2Cl_2$, $Ti(OC_2H_5)_2Cl_2$, $Ti(O-n-C_4H_9)_2Cl_2$, or $Ti(OC_2H_5)_2Br_2$; mono-halogenated alkoxy titanium such as $Ti(OCH_3)_3Cl$, $Ti(OC_2H_5)_3Cl$, $Ti(O-n-C_4H_9)_3Cl$, or $Ti(OC_2H_5)_3Br$; and tetra-alkoxy titanium such as $Ti(OCH_3)_4$, $Ti(OC_2H_5)_4$, $Ti(O-n-C_4H_9)_4$, $Ti(O-iso-C_4H_9)_4$, or $Ti(O-2-ethylhexyl)_4$.

Examples of the electron donors (a-3) for use in the preparation of the solid titanium catalyst component (I) include alcohols, phenols, ketones, aldehydes, esters of organic acids or inorganic acids, organic acid halides, ethers (preferred example: the aforesaid), acid amides, acid anhydrides, ammonias, amines, nitriles, isocyanates, nitrogen-containing cyclic compounds, and oxygen-containing cyclic compounds. Among these, preferred examples can include aromatic polyester compounds such as phthalic acid ester, aliphatic polyesters such as succinic acid ester having a substituent, the later-described alicyclic polyesters and the aforesaid. These compounds may be used alone or in combination of plural kinds.

As the electron donor (a-3) that is preferably used in the present invention, a cyclic ester compound specified by the following formula (1) can be mentioned. A cyclic ester compound specified by the following formula (2) may be included.

[Chemical Formula 1]

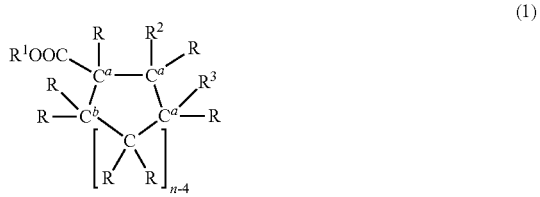

(1)

In the formula (1), n is an integer of 5 to 10. $R^2$ and $R^3$ are each independently $COOR^1$ or R, and at least one of $R^2$ and $R^3$ is $COOR^1$. A single bond (other than $C^a$-$C^a$ bond and $C^a$-$C^b$ bond in the case where $R^3$ is R) in the cyclic skeleton may be replaced with a double bond.

Each $R^1$ is independently a monovalent hydrocarbon group of 1 to 20 carbon atoms. Plural R are each independently an atom or a group selected from a hydrogen atom, a hydrocarbon group of 1 to 20 carbon atoms, a halogen atom, a nitrogen-containing group, an oxygen-containing group, a phosphorus-containing group, a halogen-containing group, and a silicon-containing group, and they may be bonded to each other to form a ring, provided that at least one R is not a hydrogen atom.

In the skeleton of the ring formed by bonding of plural R to each other, a double bond may be contained, and when two or more $C^a$ to which $COOR^1$ is bonded are contained in the skeleton of the ring, the number of carbon atoms to form the ring is 5 to 10.

[Chemical Formula 2]

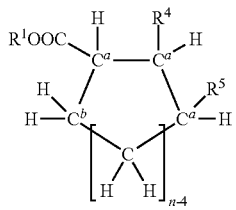

(2)

In the formula (2), n is an integer of 5 to 10.

$R^4$ and $R^5$ are each independently $COOR^1$ or a hydrogen atom, and at least one of $R^4$ and $R^5$ is $COOR^1$. Each $R^1$ is independently a monovalent hydrocarbon group of 1 to 20 carbon atoms. A single bond (other than $C^a$-$C^a$) in the cyclic skeleton may be replaced with a double bond.

In the formula (1), all of bonds between carbon atoms in the cyclic skeleton are preferably single bonds. Of the cyclic ester compounds represented by the formula (1), particularly preferable are diisobutyl 3,6-dimethylcyclohexane-1,2-dicarboxylate, di-n-hexyl 3,6-dimethylcyclohexane-1,2-dicarboxylate, di-n-octyl 3,6-dimethylcyclohexane-1,2-dicarboxylate, diisobutyl 3-methyl-6-ethylcyclohexane-1,2-dicarboxylate, di-n-hexyl 3-methyl-6-ethylcyclohexane-1,2-dicarboxylate, di-n-octyl 3-methyl-6-ethylcyclohexane-1,2-dicarboxylate, diisobutyl 3-methyl-6-n-propylcyclohexane-1,2-dicarboxylate, di-n-hexyl 3-methyl-6-n-propylcyclohexane-1,2-dicarboxylate, di-n-octyl 3-methyl-6-n-propylcyclohexane-1,2-dicarboxylate, diisobutyl 3,6-diethylcyclohexane-1,2-dicarboxylate, di-n-hexyl 3,6-diethylcyclohexane-1,2-dicarboxylate, and di-n-octyl 3,6-diethylcyclohexane-1,2-dicarboxylate.

Of the compounds represented by the formula (2), particularly preferable are diisobutyl cyclohexane-1,2-dicarboxylate, dihexyl cyclohexane-1,2-dicarboxylate, diheptyl cyclohexane-1,2-dicarboxylate, dioctyl cyclohexane-1,2-dicarboxylate, and di-2-ethylhexyl cyclohexane-1,2-dicarboxylate.

When such a magnesium compound (a-1), such a titanium compound (a-2), and such an electron donor (a-3) as above are brought into contact with one another, other reaction reagent, such as silicon, phosphorus, or aluminum may coexist, or by the use of a carrier, a carrier-supported type solid titanium catalyst component (I) can be also prepared.

The solid titanium catalyst component (I) can be prepared by adopting any of processes including known processes, and some examples are given and briefly described below.

(1) A process wherein a hydrocarbon solution of an adduct of an alcohol or a metallic acid ester and the magnesium compound (a-1) is subjected to contact reaction with the titanium compound (a-2) and an organometallic compound to precipitate a solid, and thereafter or with precipitating, the solid is subjected to contact reaction with the titanium compound (a-2).

(2) A process wherein a solid adduct of the magnesium compound (a-1) and an alcohol or an ester is subjected to contact reaction with the titanium compound (a-2) and an organometallic compound, and thereafter the reaction product is subjected to contact reaction with the titanium compound (a-2).

(3) A process wherein a contact product of an inorganic carrier with the organomagnesium compound (a-1) is subjected to contact reaction with the titanium compound (a-2) and the electron donor (a-3). In this case, the contact product may be subjected to contact reaction in advance with a halogen-containing compound and/or an organometallic compound.

(4) Any one of the above processes including a step that is carried out in the presence of an aromatic halogenated hydrocarbon.

These processes are preferred examples.

The organometallic compound catalyst component (II) preferably contains a metal selected from Group 1, Group 2, and Group 13 metals on the periodic table. Specifically, there can be mentioned such an organoaluminum compound, such a complex alkylated compound of a Group I metal and aluminum and such an organometallic compound of a Group II metal as shown below.

Organoaluminum compound (b-1) represented by the following formula:

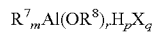

(wherein $R^7$ and $R^8$ are each a hydrocarbon group usually having 1 to 15 carbon atoms, preferably 1 to 4 carbon atoms and they may be the same as or different from each other, X is a halogen atom, and m, r, p and q are numbers satisfying the conditions of $0<m\leq3$, $0\leq r<3$, $0\leq p<3$, $0\leq q<3$ and $m+r+p+q=3$).

Complex alkylated compound of a Group I metal and aluminum (b-2) represented by the following formula: $M^1AlR^7_4$ (wherein $M^1$ is Li, Na or K, and $R^7$ is the same as above).

Dialkyl compound containing a Group 2 or Group 13 element (b-3) represented by the following formula: $R^7R^8M^2$ (wherein $R^7$ and $R^8$ are the same as above, and $M^2$ is Mg, Zn or Cd).

Examples of the organoaluminum compounds (b-1) include a compound represented by $R^7_mAl(OR^8)_{3-m}$ ($R^7$ and $R^8$ are the same as above, and m is preferably a number of $1.5\leq m\leq3$), a compound represented by $R^7_mAlX_{3-m}$ ($R^7$ is the same as above, X is a halogen, and m is preferably a number of $0<m<3$), a compound represented by $R^7_mAlH_{3-m}$ ($R^7$ is the same as above, and m is preferably a number of $2\leq m<3$), and a compound represented by $R^7_mAl(OR^8)_nX_q$ ($R^7$ and $R^8$ are the same as above, X is a halogen, $0<m\leq3$, $0\leq n<3$, $0\leq q<3$ and $m+n+q=3$).

Specific examples of the organosilicon compound catalyst component (III) include an organosilicon compound represented by the following formula (4).

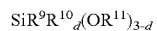

(4)

(In the formula (4), d is 0, 1 or 2, $R^9$ is a group selected from the group consisting of a cyclopentyl group, a cylohexyl group, a cyclopentenyl group, a cyclopentadienyl group, an alkyl group, a dialkylamino group, and derivatives thereof, and $R^{10}$ and $R^{11}$ are each a hydrocarbon group.)

Preferred examples of $R^9$ in the formula (4) include bulky substituents, e.g., cyclopentyl groups and derivative thereof, such as cyclopentyl group, 2-methylcyclopentyl group, 3-methylcyclopentyl group, 2-ethylcyclopentyl group, 3-proopylcyclopentyl group, 3-isopropylcyclopentyl group, 3-butylcyclopentyl group, 3-tert-butylcyclopentyl group, 2,2-dimethylcyclopentyl group, 2,3-dimethycyclopentyl group, 2,5-dimethylcyclopentyl group, 2,2,5-trimethylcyclopentyl group, 2,3,4,5-tetramethylcyclopentyl group, 2,2,5,5-tetramethylcyclopentyl group, 1-cyclopentylpropyl group and 1-methyl-1-cyclopentylethyl group; cyclohexyl groups and derivatives thereof, such as cyclohexyl group, 2-methylcyclohexyl group, 3-methylcyclohexyl group, 4-methylcyclohexyl group, 2-ethylcyclohexyl group, 3-ethylcyclohexyl group, 4-ethylcyclohexyl group, 3-propylcyclohexyl group, 3-isopropylcyclohexyl group, 3-butylcyclohexyl group, 3-tert-butylcyclohexyl group, 4-propylcyclohexyl group, 4-isopropylcyclohexyl group, 4-butylcyclohexyl group, 4-tert-butylcyclohexyl group, 2,2-dimethylcyclohexyl group, 2,3-dimethylcyclohexyl group, 2,5-dimethylcyclohexyl group, 2,6-dimethylcyclohexyl group, 2,2,5-trimethylcyclohexyl group, 2,3,4,5-tetramethylcyclohexyl group, 2,2,5,5-tetramethylcyclohexyl group, 2,3,4,5,6-pentamethylcyclohexyl group, 1-cyclohexylpropyl group and 1-methyl-1-cyclohexylethyl group; cyclopentenyl groups and derivatives thereof, such as cyclopentenyl group, 2-cyclopentenyl group, 3-cyclopentenyl group, 2-methyl-1-cyclopentenyl group, 2-methyl-3-cyclopentenyl group, 3-methyl-3-cyclopentenyl group, 2-ethyl-3-cyclopentenyl group, 2,2-dimethyl-3-cyclopentenyl group, 2,5-dimethyl-3-cyclopentenyl group, 2,3,4,5-tetramethyl-3-cyclopentenyl group and 2,2,5,5-tetramethyl-3-cyclopentenyl group; cyclopentadienyl groups and derivatives thereof, such as 1,3-cyclopentadienyl group, 2,4-cyclopentadienyl group, 1,4-cyclopentadienyl group, 2-methyl-1,3-cyclopentadienyl group, 2-methyl-2,4-cyclopentadienyl group, 3-methyl-2,4-cyclopentadienyl group, 2-ethyl-2,4-cyclopentadienyl group, 2,2-dimethyl-2,4-cyclopentadienyl group, 2,3-dimethyl-2,4-cyclopentadienyl group, 2,5-dimethyl-2,4-cyclopentadienyl group and 2,3,4,5-tetramethyl-2,4-cyclopentadienyl group; alkyl groups, such as isopropyl group, tert-butyl group and sec-butyl group; and dialkylamino groups, such as dimethylamino group, diethylamino group and dibutylamino group. More preferable are cyclopentyl group, cyclohexyl group and isopropyl group, and particularly preferable is cyclopentyl group.

Specific examples of the hydrocarbon groups of $R^{10}$ and $R^{11}$ in the formula (4) include, in addition to the abovementioned substituents, hydrocarbon groups, such as alkyl groups, cycloalkyl groups, aryl groups, and aralkyl groups. When two or more of $R^{10}$ or $R^{11}$ are present, those $R^{10}$ or those $R^{11}$ may be the same or different, and $R^{10}$ and $R^{11}$ may be the same or different. In the formula (4), $R^{10}$ and $R^{11}$ may be crosslinked by an alkylene group or the like.

Specific examples of the organosilicon compounds represented by the formula (4) include trialkoxysilanes, such as diethylaminotriethoxysilane, cyclopentyltrimethoxysilane, 2-methylcyclopentyltrimethoxysilane, 2,3-dimethylcyclopentyltrimethoxysilane, 2,5-dimethylcyclopentyltrimethoxysilane, cyclopentyltriethoxysilane, cyclopentenyltrimethoxysilane, 3-cyclopentenyltrimethoxysilane, 2,4-cyclopentadienyltrimethoxysilane, and cyclohexyltrimethoxysilane; dialkoxysilanes, such as diisopropyldimethoxysilane, tert-butylethyldimethoxysilane, cyclopentyl-tert-butyldimethoxysilane, cyclohexylisobutyldimethoxysilane, bisdiethylaminodimethoxysilane, dicyclopentyldimethoxysilane, bis(2-methylcyclopentyl)dimethoxysilane, bis(3-tert-butylcyclopentyl)dimethoxysilane, bis(2,3-dimethylcyclopentyl)dimethoxysilane, bis(2,5-dimethylcyclopentyl)dimethoxysilane, dicyclopentyldiethoxysilane, dicyclopentenyldimethoxysialne, di(3-cyclopentenyl) dimethoxysilane, bis(2,5-dimethyl-3-cyclopentenyl) dimethoxysilane, di-2,4-cyclopentadienyldimethoxysilane, bis(2,5-dimethyl-2,4-cyclopentadienyl)dimethoxysilane, bis(1-methyl-1-cyclopentylethyl)dimethoxysilane, cyclopentylcyclopentenyldimethoxysilane, cyclopentylcyclopentadienyldimethoxysilane, cyclopentadienylindenyldimethoxysilane, and dicyclohexyldimethoxysilane; and monoalkoxysilanes, such as tricyclopentylmethoxysilane, tricyclopentenylmethoxysilane, tricyclopentadienylmethoxysilane, tricyclopentylethoxysilane, dicyclopentylmethylmethoxysilane, dicyclopentylethylmethoxysilane, dicyclopentylmethylethoxysilane, cyclopentyldimethylmethoxysilane, cyclopentyldiethylmethoxysilane, cyclopentyldimethylethoxysilane, bis(2,5-dimethylcyclopentyl)cyclopentylmethoxysilane, dicyclopentylcyclopentenylmethoxysilane, dicyclopentylcyclopentadienylmethoxysilane and tricyclohexylmethoxysilane. Among these, diisopropyldimethoxysilane, tert-butylethyldimethoxysilane, cyclopentyl-tert-butyldimethoxysilane, cyclohexylisobutyldimethoxysilane, bisdiethylaminodimethoxysilane, diethylaminotriethoxysilane and dicylopentyldimethoxysilane are preferable because stereoregularity of propylene homopolymer is enhanced, and among these, dicyclopentyldimethoxysilane is particularly preferable. These compounds can be used singly or in combination of two or more kinds.

Prior to the polymerization of propylene using a catalyst comprising such a solid titanium catalyst component (I), such an organometallic compound catalyst component (II), and such an organosilicon compound catalyst component (III) as above, prepolymerization can be also carried out in advance. In the prepolymerization, an olefin is polymerized in the presence of the solid titanium catalyst component (I), the organometallic compound catalyst component (II), and if necessary, the organosilicon compound catalyst component (III).

As the prepolymerization olefin, for example, an α-olefin of 2 to 8 carbon atoms can be used. Specifically, straight-chain olefins, such as ethylene, propylene, 1-butene, and 1-octene; olefins having a branched structure, such as 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, and 3-ethyl-1-hexene; etc. can be used. These may be copolymerized. For the purpose of enhancing crystallinity of the resulting propylene homopolymer, bulky olefins such as 3-methyl-1-butene and 3-methyl-1-pentene are preferably used in some cases.

It is desirable to carry out the prepolymerization in such a manner that about 0.1 to 1000 g, preferably about 0.3 to 500 g, of a polymer is produced based on 1 g of the solid titanium catalyst component (I). If the prepolymerization quantity is too large, efficiency of production of a polymer in the polymerization is sometimes lowered. In the prepolymerization, the catalyst can be used in a considerably higher concentration than the catalyst concentration in the system in the polymerization.

In the polymerization, the solid titanium catalyst component (I) (or the prepolymerization catalyst) is desirably used in an amount of about 0.0001 to 50 mmol, preferably about 0.001 to 10 mmol, in terms of a titanium atom, based on 1 L of the polymerization volume. The organometallic compound catalyst component (II) is desirably used in an amount of about 1 to 2000 mol, preferably about 2 to 500 mol, in terms of a metal atom, based on 1 mol of a titanium atom in the polymerization system. The organosilicon compound catalyst component (III) is desirably used in an amount of about 0.001 to 50 mol, preferably about 0.01 to 20 mol, based on 1 mol of a metal atom of the organometallic compound catalyst component (II).

The polymerization may be carried out by any of a gas phase polymerization process and a liquid phase polymerization process such as a solution polymerization process or a suspension polymerization process, and each step of the polymerization may be carried out by different processes. Alternatively, it may be carried out continuously or semi-continuously. By dividing it into plural polymerization vessels, e.g., 2 to 10 polymerization vessels, each step may be carried out using the thus divided polymerization vessels.

As polymerization media, inert hydrocarbons may be used, or liquid propylene may be used as a polymerization medium. As the polymerization conditions in each step, the polymerization temperature is appropriately selected in the range of about −50° C. to +200° C., preferably about 20° C. to 100° C., and the polymerization pressure is appropriately selected in the range of normal pressure to 10 MPa (gauge pressure), preferably about 0.2 to 5 MPa (gauge pressure).

After completion of the polymerization, known post treatment steps, such as catalyst deactivation step, catalyst residue removal step, and drying step, are carried out when needed, whereby propylene homopolymer is obtained as a powder. As the solid titanium catalyst components, some of the catalysts disclosed in, for example, JP 2723137 B, JP 2776914 B, WO 2006/77945, WO 2008/10459, JP H04-218507 A, JP 2774160 B, WO 2004/16662, JP 2011-256278 A, and JP 2009-57473 A, can be also used.

[Form of Propylene Homopolymer]

The propylene homopolymer according to the present invention may be in any form of powders, granules and pellets. The powders and granules are obtained from the propylene homopolymer, and the pellets are obtained by pelletizing the powders or the granules.

[Polypropylene (F) for Film Capacitor]

Polypropylene (F) obtained herein contains at least the propylene homopolymer and an α crystal nucleating agent having a specific melting point described below. Preferably, polypropylene (F) is obtained by melt-kneading at least the propylene homopolymer and the α crystal nucleating agent. Polypropylene (F) has a very wide range of temperatures available for stretching when a film is biaxially stretched, thereby allowing the film to be biaxially stretched in a uniform manner. Therefore, according to the present invention, a biaxially stretched thin film, which has no granular defects or separation voids as it is uniformly stretched, and thus has sufficient breakdown voltage, and in particular, high breakdown voltage even when used at a high temperature, and small thermal shrinkage ratio, can be obtained.

Although the reason for that is unclear, the present inventors presume as follows. By blending the α crystal nucleating agent with the propylene homopolymer according to the present invention, fine spherocrystals are generated in polypropylene (F). Generation of the fine spherocrystals results in excellent dispersibility of fine crystals after pulverized the spherocrystals by stretching, which remarkably improves stretchability and uniformity upon biaxial stretching. Accordingly, it is presumed that the biaxially stretched has remarkably improved breakdown voltage, and in particular, high breakdown voltage at a high temperature and a high frequency current.

[α Crystal Nucleating Agent]

The α crystal nucleating agent is not particularly limited as long as it is a nucleating agent having a specific melting point. If, as the α crystal nucleating agent, nucleating agents having no melting point such as talc, mica, sodium 2,2'-methylenebis(4,6-di-tert-butylphenyl) phosphate, and hydroxy-di-para-t-butylbenzoic acid aluminum are used, the effects of improving stretchability and breakdown voltage cannot be obtained because they will be present as a foreign object in a film.

The melting point of the α crystal nucleating agent is usually not more than 290° C., preferably not more than 270° C., more preferably 100° C. to 270° C., and for the reason of heat resistance upon use, furthermore preferably 120° C. to 260° C. When the melting point exceeds 290° C., the α crystal nucleating agent is not melted when blended with the propylene homopolymer, which might make the nucleating agent to remain as a foreign object in the homopolymer. This might cause breakage during film formation or deterioration of quality in terms of appearance, capacitor properties, etc. of the resulting biaxially stretched film, which is not preferable. In addition, the lower limit of the melting point is not particularly limited as long as the effects of the present invention can be obtained; however, when the melting point is excessively low, smoking from or adherence of the nucleating agent in a forming machine occurs during production of a film capacitor, which might inhibit productivity.

The melting point can be measured in the following manner.

An exothermic/endothermic curve is determined by a differential scanning calorimeter and the temperature at the maximum melt peak position during temperature increase is designated as Tm. Upon measurement, the melting point (Tm) is obtained using, for example, a differential scanning calorimeter to analyze an endothermic peak observed when about 5 mg of a sample is placed in an aluminum-made perforated sample pan with an internal volume of 30 µL, the pan is covered with an aluminum-made lid, and the temperature is increased at a rate of 10° C./min to 350° C.

According to the present invention, the α crystal nucleating agent is preferably soluble in the propylene homopolymer. A soluble α crystal nucleating agent shows features of being solubilized upon heating and recrystallized upon cooling in a series of steps, and is characterized by the improvement of dispersibility. A process for determining solubilization and recrystallization described as above is disclosed by, for example, Kristiansen et al. in Macromolecules 38 (2005) (pp. 10461 to 10465) and Balzano et al. in Macromolecules 41 (2008) (pp. 5350 to 5355). Specifically, solubilization and recrystallization can be monitored using melt rheology in the dynamic mode as defined in ISO6271-10:1999.

The addition amount of the α crystal nucleating agent is not particularly limited, but is usually 1 to 2000 ppm, preferably 10 to 1500 ppm, and more preferably 50 to 1000 ppm based on 100% by weight of the propylene homopolymer. When the addition amount of the α crystal nucleating agent is less than 1 ppm, the effects of blending the α crystal nucleating agent cannot be obtained, and therefore, the effects of stretchability and breakdown current cannot be obtained. In addition, when the amount exceeds 2000 ppm, the α crystal nucleating agent bleeds out, which disadvantageously may cause failures such as roll contamination.

Examples of the α crystal nucleating agent include nonitol derivatives and sorbitol derivatives. Nonitol derivatives are preferable because, for example, they have few impacts on the working environment and are unlikely to cause roll contamination. Such α crystal nucleating agents may be used alone or in combination of plural kinds.

The compound represented by the following formula (A1) can be used as a sorbitol derivative.

[Chemical Formula 3]

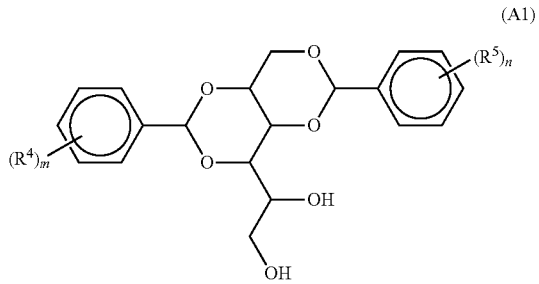

(A1)

[Chemical Formula 4]

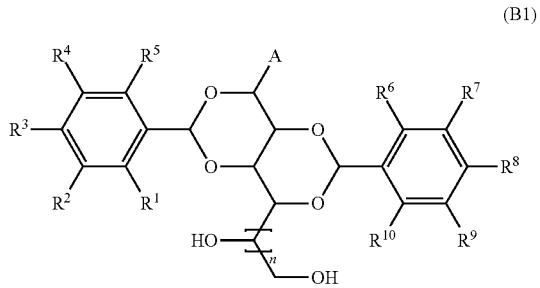

(B1)

In formula (A1), $R^4$ and $R^5$ may be the same as or different from each other and are each an alkyl group having 1 to 8 carbon atoms, a halogen atom, or an alkoxy group having 1 to 4 carbon atoms, and m and n are each independently an integer of 0 to 3.

Specific examples thereof include: 1,3,2,4-dibenzylidene sorbitol, 1,3-benzylidene-2,4-p-methylbenzylidene sorbitol, 1,3-benzylidene-2,4-p-ethylbenzylidene sorbitol, 1,3-p-methylbenzylidene-2,4-benzylidene sorbitol, 1,3-p-ethylbenzylidene-2,4-benzylidene sorbitol, 1,3-p-methylbenzylidene-2,4-p-ethylbenzylidene sorbitol, 1,3-p-ethylbenzylidene-2,4-p-methylbenzylidene sorbitol, 1,3,2,4-di(p-methylbenzylidene) sorbitol, 1,3,2,4-di(p-ethylbenzylidene) sorbitol, 1,3,2,4-di(p-n-propylbenzylidene)sorbitol, 1,3,2,4-di(p-iso-propylbenzylidene)sorbitol, 1,3,2,4-di(p-n-butylbenzylidene)sorbitol, 1,3,2,4-di(p-s-butylbenzylidene) sorbitol, 1,3,2,4-di(p-tert-butylbenzylidene)sorbitol, 1,3,2,4-di(2',4'-dimethylbenzylidene)sorbitol, 1,3,2,4-di(p-methoxybenzylidene) sorbitol, 1,3,2,4-di(p-ethoxybenzylidene)sorbitol, 1,3-benzylidene-2-4-p-chlorobenzylidene sorbitol, 1,3-p-chlorobenzylidene-2,4-benzylidene sorbitol, 1,3-p-chlorobenzylidene-2,4-p-methylbenzylidene sorbitol, 1,3-p-chlorobenzylidene-2,4-p-ethylbenzylidene sorbitol, 1,3-p-methylbenzylidene-2,4-p-chlorobenzylidene sorbitol, 1,3-p-ethylbenzylidene-2,4-p-chlorobenzylidene sorbitol, and 1,3,2,4-di(p-chlorobenzylidene) sorbitol; and mixtures of two or more thereof. Of these, 1,3,2,4-dibenzylidene sorbitol, 1,3,2,4-di(p-methylbenzylidene) sorbitol, 1,3,2,4-di(p-ethylbenzylidene) sorbitol, 1,3-p-chlorobenzylidene-2,4-p-methylbenzylidene sorbitol, 1,3,2,4-di(p-chlorobenzylidene) sorbitol, and mixtures of two or more thereof are particularly preferable.

Examples of nonitol derivatives include the compound represented by formula (1) described in JP 2009-120821 A (see paragraph Nos. 0020 to 0024 and 0027). More specific examples thereof include the compound represented by the following general structural formula (B1).

In the above structural formula (B1), n is 0, 1, or 2.

A represents a non-hydrogen group. A non-hydrogen group A is an alkyl group having 1 to 20 carbon atoms or an alkenyl group having 2 to 20 carbon atoms, and a hydrogen atom in such group 156 may be substituted with an halogen atom or a hydroxyl group. Preferably, a non-hydrogen group A is $-CH_3$, $-CH_2CH_3$, $-CH_2CH_2CH_3$, $-CH_2CH_2CH_2CH_3$, $-CH_2CH=CH_2$, $-CH(CH_3)$ $CH=CH_2$, $-CH_2CH-X-CH_2-X'$, $-CH_2CH-X''-CH_2-CH_3$, $-CH_2CH-X'''-CH_2OH$, or $-CH-OH-CH-OH-CH_2-OH$. Note that X, X', X'' and X''' are each a halogen atom or a halogenated hydrocarbon group such as a halogenated alkyl group. Preferably, they are each a fluorine atom, chlorine atom, or bromine atom, or a halogenated alkyl group including a fluorine atom, chlorine atom, or bromine atom.

$R^1$ to $R^{10}$ may be the same as or different from each other and are each a hydrogen atom, halogen atom, phenyl group, alkyl group having 1 to 20 carbon atoms, alkenyl group having 2 to 20 carbon atoms, alkoxy group having 1 to 20 carbon atoms, or an acyl group having 1 to 20 carbon atoms, and a hydrogen atom in the phenyl, alkyl, alkenyl, alkoxy, or acyl group may be substituted with a halogen atom. A halogen atom, although not particularly limited, is preferably a fluorine atom.

Any two adjacent groups selected from $R^1$ to $R^{10}$ may form together a cyclic group.

In order to improve stretchability and uniformity upon biaxial stretching and breakdown voltage upon secondary stretching, it is further preferable that, in structural formula (B1), n is 0, 1, or 2, $R^1$, $R^2$, $R^4$, $R^5$, $R^6$, $R^7$, $R^9$, and $R^{10}$ are each a hydrogen atom, and $R^3$, $R^8$, and A are each an alkyl group having 1 to 20 carbon atoms.

A process for producing the compound represented by formula (B1) is not particularly limited; however, one example is the process described in WO2005/111134.

In addition, a preferable nonitol derivative may be 1,2,3-trideoxy-4,6:5,7-bis-O-[(4-propylphenyl)methylene]-nonitol, which can be readily obtained as a commercially available product. One example is Millad NX8000 manufactured by Milliken & Company.

[Other Additives]

The propylene homopolymer and polypropylene (F) according to the present invention may be obtained with the addition of known additives that can usually be blended with polypropylene resin, such as a cross-linking agent, a weathering stabilizer, a heat stabilizer, an antistatic agent, an anti-slip agent, an anti-blocking agent, an anti-fogging agent, a lubricating agent, a pigment, a dye, a plasticizer, an anti-aging agent, a hydrochloric acid absorbent, and an antioxidant, and a neutralizing agent, together with the α crystal nucleating agent, within limits not detrimental to the object of the present invention.

The addition amount of the additive is not particularly limited as long as the effects of the present invention can be obtained, but is usually 0.0001 to 10 parts by weight and preferably 0.01 to 5 parts by weight based on 100 parts by weight of propylene homopolymer or polypropylene (F).

When an antioxidant is blended, the addition amount thereof is usually about 500 to 8000 ppm, preferably 500 ppm to less than 8000 ppm, and more preferably 750 ppm to less than 7500 ppm based on propylene homopolymer or polypropylene (F).

In addition, when a neutralizing agent is blended for preventing defects of the film, such as fish eye and increase in the amount of a tacky component, the addition amount thereof is usually about 5 to 1000 ppm, preferably 5 ppm to less than 1000 ppm, more preferably 10 ppm to less than 750 ppm, and furthermore preferably 15 ppm to less than 500 ppm based on propylene homopolymer or polypropylene (F).

[Process for Producing Polypropylene (F) for Film Capacitor]

Polypropylene (F) of the present invention can be produced using a known process. For example, a process comprising melt-kneading propylene homopolymer with the α crystal nucleating agent and optionally the aforesaid additive by the use of a usual kneading apparatus, such as Henschel Mixer, ribbon blender or Banbury mixer, can be mentioned. With regard to melt-kneading and pelletization, the components are melt-kneaded at usually 170° C. to 280° C. and preferably 190° C. to 250° C., using a usual single screw or twin-screw extruder, a Bravender, or a roll, and then pelletized. Alternatively, without performing pelletization, polypropylene (F) can be directly formed into an original sheet or film used as raw material for a biaxially stretched film by a known technique.

[Biaxially Stretched Film for Film Capacitor, Process for Producing the Same, and Film Capacitor]

A biaxially stretched film is formed by stretching polypropylene (F), and it has no granular defects or separation voids, sufficient breakdown voltage, and in particular, high breakdown voltage even when used at a high temperature, and a small thermal shrinkage ratio. In addition, polypropylene (F) exhibits excellent stretchability, and thus, can provide a thin film of a biaxially stretched film obtained.

The range of temperatures available for stretching of a biaxially stretched film is usually not less than 8° C., preferably not less than 9° C., and more preferably not less than 10° C. When the range of temperatures available for stretching falls within the above range, a biaxially stretched film with excellent productivity can be obtained, which is preferable.

The range of temperatures available for stretching can be measured by, for example, the process described in the Examples.

A film capacitor comprising a biaxially stretched film obtained herein can maintain sufficient quality even when used in a harsh environment with a high temperature and a high frequency current, and it can show its performance sufficient for the use in a small-sized capacitor with large capacity, which can greatly contribute, for example, to allowing hybrid automobiles to have higher output and lighter weight.

The thermal shrinkage ratio (%) obtained based on the proportion of shrinkage from the original length of a biaxially stretched film, when cutting the biaxially stretched film in the resin flow direction (MD) to result in a width of 10 mm and a length of 100 mm and heating the biaxially stretched film in an oven at usually 120° C. for 15 minutes, is not particularly limited as long as the effects of the present invention can be obtained; however, it is preferably −2.0% to +2.0% and more preferably −1.5% to +1.5%. The thermal shrinkage ratio lower than the above range makes the winding tightness insufficient, which may make the form-retention difficult or cause voids leading to the deterioration of the elements. The thermal shrinkage ratio higher than the above range may lead to the deformation of the elements or occurrence of voids due to the deformation, which may deteriorate or break the elements.

The thickness of the biaxially stretched film is not particularly limited as long as the effects of the present invention can be obtained; however, it is preferably 1 to 20 μm, more preferably 1 to 15 μm, further preferably 1.2 to 10 μm, furthermore preferably 1.5 to 8 μm, and particularly preferably 1.8 to 8 μm. A biaxially stretched film having a thickness within the above range, compared with when using a previously known material, exhibits superior electric characteristics (breakdown voltage). A film having a thickness less than the above range may be difficult to mold by current technique, and the use of a film having a thickness exceeding the above range increases the size of a film capacitor, and the current demand for smaller sized capacitor may not be satisfied. In general, as electric resistance is increased in order to achieve high breakdown voltage, the film thickness is increased. However, conventional films cannot meet the demand for size reduction. The biaxially stretched film of the present invention is a thin film as described in the above, and thus, a film capacitor comprising the biaxially stretched film obtained herein can maintain sufficient quality even when used in a harsh environment with a high temperature and a high frequency current.

The biaxially stretched film can be obtained by melt-extruding, at usually 180° C. to 280° C., polypropylene (F), optionally adding thereto various additives such as various antioxidants (e.g., Irganox 1010, BHT (dibutylhydroxytoluene) and Irgafos 168) and calcium stearate, and then subjecting an original sheet obtained, for example, to monoaxial stretching where an original sheet obtained is stretched at usually 100° C. to 160° C. at a stretching ratio of usually 2 to 10 times in the machine direction (i.e., the direction parallel to the flow of the resin extruded when the original sheet is prepared); to biaxial stretching where a film obtained through the monoaxial stretching is subjected to successive stretching under similar conditions to those in the monoaxial stretching in the direction perpendicular to the machine direction; or to simultaneous biaxial stretching where the sheet is stretched in the machine direction and in the direction perpendicular to the machine direction at the same time.

At an industrial scale, the biaxially stretched film for a film capacitor can be obtained by various known simultaneous biaxial stretching or successive biaxial stretching methods, for example, tubular film method, and tenter method.

In the tenter method, a melt sheet which obtained by melt-extruded from a T-die is solidified at a cooling roll, and the sheet is pre-heated as needed, and introduced into a stretching zone, and then, stretched at usually 100° C. to 160° C. at a stretching ratio of usually 3 to 7 times in the longitudinal direction and at a stretching ratio of usually 5 to 11 times in the transversal direction. The total area stretching ratio is usually 20 to 70 times, preferably 30 to 50 times. If the total area stretching ratio is below 20 times, film strength cannot increase, while if it exceeds 70 times, the film tends to have voids, have lowered strength in the width direction and tear in the longitudinal direction. As needed, finally, the biaxially stretched film is heat-set at usually 160° C. to 190° C.

In the present invention, the biaxially stretched film can be used in a known film capacitor. The biaxially stretched film for a film capacitor of the present invention, even though being a thin film, exhibits high breakdown voltage, and allows even a small-sized capacitor to have high capacitor capacity.

EXAMPLES

Hereinafter, the present invention will be described with reference to Examples, but the present invention is in no way limited by these Examples.

In Examples and Comparative Examples, various properties were measured as follows.

(1) Melt Flow Rate (MFR)

The MFR of a specimen (propylene homopolymer) was measured at 230° C. under a load of 2.16 kg in accordance with JIS K 7210.

(2) Isotactic Pentad Fraction (Mmmm Fraction)

The isotactic pentad fraction (mmmm fraction) of a specimen (propylene homopolymer) was measured based on the assignment shown in Macromolecules, 8,687 (1975) by A. zambelli et al., using $^{13}$C-NMR under the following conditions, to obtain a meso pentad fraction=(an area of peaks at 21.7 ppm)/(an area of peaks at 19 to 23 ppm).

<Measurement Conditions>
Type: JNM-Lambada400 (manufactured by JEOL Ltd.)
Decomposition Capacity: 400 MHz
Measurement Temperature: 125° C.
Solvent: 1,2,4-trichlorobenzene/deuterated benzene=7/4
Pulse Width: 7.8 μsec
Pulse Interval: 5 sec
Number of Integration: 2000
Shift Standard: TMS=0 ppm
Mode: single pulse broadband decoupling (3) Ash Amount A specimen (propylene homopolymer) in an amount of 100 g was put into a porcelain crucible, which was heated and burnt on an electric heater, and introduced into an electric furnace at 800° C. for 30 minutes, thereby completely changing the specimen into ash. The crucible was cooled in a desiccator for one hour. Then, the ash weight was measured with a precision of 0.1 mg by a precise scale to calculate the ash amount in a sample (ppm).

(4) Chlorine Amount

A sample (propylene homopolymer) in an amount of about 0.8 g was set in a combustion equipment manufactured by Mitsubishi Kasei Corporation, and was combusted at 400° C. to 900° C. in an argon/oxygen stream, then a combustion gas coming out from the equipment was passed through absorbing liquid (ultrapure water) to capture chlorine. The absorbing liquid was introduced into an ion chromatograph equipped with a concentration device (DX-300 manufactured by Nippon Dionex K.K., an anion column AS4A-SC manufactured by Nippon Dionex K.K.,) and the chlorine content was calculated based on the resulting chromatogram area. The detection limit was 1 ppm.

(5) Molecular Weight Distribution (Mw/Mn)

The molecular weight distribution (Mw/Mn) was measured as follows by the use of 150CV-type manufactured by Waters. ShodexAD-806 ms manufactured by Showa Denko K.K. was used as a separation column. The column temperature was set to 135° C., o-dichlorobenzene was used for a mobile phase, and the sample (propylene homopolymer) concentration was adjusted to 7.5 mg/4 mL. Regarding standard polystyrenes, the polystyrene manufactured by Tosoh Corporation having a molecular weight within the range of Mw<1000 and Mw>4×10$^6$, and the polystyrene manufactured by Pressure Chemical Company having a molecular weight within the range of 1000≤Mw≤4×10$^6$ were used.

(6) Proportion of <2,1> Erythro Regio Defects

The proportion of 2,1-inserted propylene monomers in the total propylene unit was measured using $^{13}$C-NMR in accordance with the method described in JP H07-145212 A.

Specifically, $^{13}$C-NMR spectra were determined by the complete proton decoupling method at 120° C. after completely dissolving 50 to 60 mg of a sample in a solvent containing about 0.5 ml of hexachlorobutadiene, o-dichlorobenzene, or 1,2,4-trichlorobenzene supplemented with about 0.05 ml of deuterated benzene as a locking solvent inside an NMR sample tube (5 mmφ). The selected measurement conditions were a flip angle of 45°, a pulse interval of not less than 3.4 T$_1$ (T$_1$ is the longest time for spin-lattice relaxation of methyl groups). Note that as T$_1$ for the methylene and methine groups is shorter than that for the methyl group in a propylene homopolymer, recovery of total carbon magnetization is not less than 99% under these measurement conditions.

The proportion of <2,1> erythro regio defects was calculated by the following Formula as the frequency of 2,1-propylene monomer insertion based on the total propylene insertion. Note that ΣICH$_3$ represents the total area of methyl groups in the Formula. In addition, Iαδ and Iβγ, represent the αβ peak (resonance at around 37.1 ppm) area and the βγ peak (resonance at 27.3 ppm) area, respectively. These methylene peaks were named in accordance with the method of Carman et al. (Rubber Chem. Technol., 44 (1971), 781).

[Formula 1]

Proportion of regio-irregular units based on 2,1-$insertioin$ (%) =

$$\frac{0.5 \times [methyl(16.5 - 17.5 \text{ ppm}) area]}{\Sigma ICH_3 + (I\alpha\sigma + I\beta\gamma)/4} \times 100$$

(7) Melting Point (Tm)

(7-1) Melting Point of a Crystal Nucleating Agent (Tm, ° C.)

The endothermic peak observed using a differential scanning calorimeter (DSC7 manufactured by PerkinElmer Co., Ltd.) when placing about 5 mg of a sample in an aluminum-made perforated sample pan with an internal volume of 30 μL, covering the pan with an aluminum-made lid, and increasing the temperature at a rate of 10° C./min to 350° C. was defined as the melting point (Tm).

(7-2) Melting Point of Propylene Homopolymer (Tm, ° C.)

About 0.40 g of a sample (propylene homopolymer) was put into a mold for forming a film with a thickness of 0.2 mm, heated at 240° C. for 7 minutes, and cool-pressed, thereby preparing a film. From a film obtained, a film in an amount of 5.0 mg±0.5 mg was cut out, and crimped with an exclusively-used aluminum pan, thereby proving a measurement sample. The melting point (Tm) was determined from an endothermic curve prepared when by the use of DSC 7 manufactured by PerkinElmer Co., Ltd., the sample was held under nitrogen stream at 30° C. for 0.5 minutes, heated at a rate of 30° C./min from 30° C. to 240° C., held at 240° C. for 10 minutes, cooled at a rate of 10° C./min from 240° C. to 30° C., held at 30° C. for 2 minutes, and then heated at a rate of 10° C./min.

(8) Range of Temperatures Available for Stretching

The range of temperatures available for stretching was determined based on a temperature range, in which a film was not broken when stretched while changing the temperature for preheating the original sheet with a thickness of 250 μm from 145° C. to 165° C. at 1° C. interval.

(9) Breakdown Voltage (BDV)

A biaxially stretched film for breakdown voltage measurement was prepared by stretching the original sheet with a thickness of 250 μm at the median temperature within the range of temperatures available for stretching. Stretching conditions are as follows.

<Stretching Conditions>

Stretching Apparatus: KAROIV (product name) manufactured by BRUCKNER

Preheating Temperature: 154° C.

Preheating Time: 60 seconds

Stretch Ratio: Sequential biaxial stretching by 5 times in the longitudinal direction (machine direction)×7 times in the lateral direction (area stretching ratio: 45 times)

Stretching Rate: 6 m/min

Subsequently, in accordance with JIS C2330, voltage was applied to the biaxially stretched film (250 mm×300 mm, 5 μm in thickness) obtained above by the use of a six-point direct-current alternate-current converting type 15 KV pressure resistant tester manufactured by Kasuga Electric Works, Ltd, at a temperature of 120° C., at a voltage increase of 100 to 500 V/sec, thereby measuring the breakdown voltage and thus obtaining the pressure resistant property. The upper electrode was a brass-made column having a mass of 500 g and a diameter of 25 mmϕ, which was provided as a positive electrode, and the lower electrode was a silicon rubber wrapped with an aluminum foil specified in JIS-H-4160, which was provided as a negative electrode. Six 156 points of each of three sheets of the film were measured, and an average value thereof was defined as a BDV value.

The breakdown voltage is obtained by dividing a measured value (V) of the breakdown withstand voltage by a thickness (μm) of the film.

Production Example 1 of Propylene Homopolymer (PP1)

(1) Preparation of Solid Catalyst

A high-speed stirring apparatus having an internal volume of 2 L (product name: TK homomixer M type, manufactured by Tokushu Kika Kogyo Co., Ltd.) was thoroughly purged with nitrogen. Thereafter, 700 mL of purified decane, 10 g of magnesium chloride, 24.2 g of ethanol and 3 g of Reodol (registered trademark) SP-S20 (trade name, manufactured by Kao Corporation, sorbitan distearate) were placed in this apparatus. Then, with stirring this suspension, the apparatus was heated, and the suspension was stirred at 800 rpm for 30 minutes at 120° C. Subsequently, with stirring this suspension at a high speed so that a precipitate should not be formed, the suspension was transferred into a 2-L glass flask (equipped with stirrer) containing 1 L of purified decane having been cooled to −10° C. in advance, by the use of a Teflon (registered trademark) tube having an inner diameter of 5 mm. A solid adduct having been formed by the liquid transfer was filtered and sufficiently washed with purified n-heptane to obtain a solid adduct to which 2.8 mol of ethanol had been coordinated based on 1 mol of magnesium chloride.

The solid adduct was suspended in decane, and in 100 mL of titanium tetrachloride maintained at −20° C., 23 mmol (in terms of magnesium atom) of the solid adduct was introduced with stirring to obtain a mixed liquid. The temperature of the mixture solution obtained was raised to 80° C. over 5 hours. When the temperature was reached to 80° C., diisobutyl 3,6-dimethylcyclohexane-1,2-dicarboxylate (mixture of cis isomer and trans isomer) was added in an amount of 0.15 mol based on 1 mol of a magnesium atom of the solid adduct, and the temperature was raised up to 110° C. over 40 minutes. The temperature was maintained at 110° C. for 90 minutes with stirring to allow them to react with each other.

After completion of the reaction, a solid was collected by hot filtration. The solid was resuspended in 100 mL of titanium tetrachloride. Then, when a temperature of 110° C. was reached, the temperature was maintained for 45 minutes with stirring to allow them to react with each other. After completion of the reaction, a solid was collected by hot filtration again, and the solid was sufficiently washed with decane at 100° C. and heptane until a titanium compound liberated in the wash liquid came to be not detected.

(2) Production of Prepolymerization Catalyst

In an autoclave having an internal volume of 200 L and equipped with a stirrer, 130 g of the solid titanium catalyst component prepared in the above (1), 71 mL of triethylaluminum and 65 L of heptane were introduced. With maintaining the internal temperature at 10° C. to 18° C., 1300 g of propylene was introduced, and reaction was carried out for 60 minutes with stirring, thereby obtaining a prepolymerization catalyst. The resulting prepolymerization catalyst contained 10 g of polypropylene based on 1 g of the solid titanium catalyst component.

(3) Polymerization

To a polymerization vessel having an internal volume of 1000 L and equipped with a stirrer were continuously fed propylene at 138 kg/Hr, the prepolymerization catalyst at 1.7 g/Hr, triethylaluminum at 12 mL/Hr, and dicyclopentyldimethoxysilane at 22 mL/Hr. Further, hydrogen was fed so that the hydrogen concentration in the gas phase portion might become 2.5% by mol. Polymerization was carried out at a polymerization temperature of 70° C. and a pressure of 3.0 MPa/G.

The resulting slurry was sent to a polymerization vessel having an internal volume of 500 L and equipped with a stirrer, and polymerization was further carried out. To the polymerization vessel, propylene was fed at 33 kg/Hr, and hydrogen was fed so that the hydrogen concentration in the gas phase portion might become 1.8% by mol. Polymerization was carried out at a polymerization temperature of 67° C. and a pressure of 2.9 MPa/G.

The resulting slurry was sent to a polymerization vessel having an internal volume of 500 L and equipped with a stirrer, and polymerization was further carried out. To the polymerization vessel, propylene was fed at 13 kg/Hr, and hydrogen was fed so that the hydrogen concentration in the gas phase portion might become 1.5% by mol. Polymerization was carried out at a polymerization temperature of 65° C. and a pressure of 2.7 MPa/G.

Slurry obtained was transferred to a washing tank using liquid propylene where the propylene homopolymer powder was washed. The resulting slurry solvent was vaporized and then subjected to gas-solid separation to obtain a propylene homopolymer. The resulting propylene homopolymer was introduced into a conical dryer and subjected to vacuum drying at 80° C. Subsequently, based on 100 kg of the product, 60 g of pure water and 0.54 L of propylene oxide were added, then dechlorination treatment was carried out at 90° C. for 2 hours. Thereafter, vacuum drying was carried out at 80° C. to obtain a propylene homopolymer (hereinafter also referred to as "PP1a") powder.

(4) Production of Propylene Homopolymer Pellet 100 parts by mass of the resulting propylene homopolymer (PP1a) were blended with 0.2 parts by mass of 3,5-di-t-butyl-4-hydroxytoluene, 0.5 parts by mass of tetrakis[methylene-3-(3,5-di-tert-butyl-4-hydroxyphenyl)propionate]methane as the antioxidant, 0.01 parts by mass of calcium stearate as the neutralizing agent, and 0.003 parts by mass of 2,5-dimethyl-2,5-di(t-butylperoxy)hexane. The blend was melt-kneaded at 230° C. to pelletize the propylene homopolymer (PP1a) using a single screw extruder. Thus, propylene homopolymer (PP1) was obtained. GMZ50-32 (trade name, manufactured by GM Engineering, Inc., L/D=32, 50 mmϕ single screw) was used as a pelletizer.

Production Example 2 of Propylene Homopolymer (PP2)

(1) Preparation of Solid Catalyst 300 g of anhydrous magnesium chloride, 1.6 L of kerosine, and 1.5 L of 2-ethylhexyl alcohol were heated at 140° C. for 3 hours to prepare a homogeneous solution. To the solution, 70 g of phthalic anhydride was added, then they were stirred at 130° C. for 1 hour to dissolve the phthalic anhydride, and thereafter, the solution was cooled down to room temperature. Further, the solution was dropwise added slowly to 8.5 L of titanium tetrachloride having been cooled to −20° C. After completion of the dropwise addition, the temperature was raised up to 110° C., then 215 mL of diisobutyl phthalate was added, and the mixture was stirred for 2 hours. The resulting solid was separated by hot filtration, then the solid was suspended in 10 L of titanium tetrachloride again, and the suspension was stirred at 110° C. for 2 hours again. The resulting solid was separated by hot filtration, and the solid was washed with n-heptane until titanium came to be not detected substantially in the wash liquid. The resulting solid catalyst contained 2.2% by mass of titanium and 11.0% by mass of diisobutyl phthalate.

(2) Polymerization

An autoclave having an internal volume of 70 L and having been sufficiently dried and purged with nitrogen was prepared, then a mixture obtained by diluting 2 mL of triethylaluminum with 1000 mL of heptane, 0.8 mL of dicyclopentyldimethoxysilane and 150 mg of the above solid catalyst were placed, then 20 kg of propylene and 17 NL of hydrogen were added, and they were polymerized at 70° C. for 2 hours. After the polymerization, unreacted propylene was separated by decantation, and the polymerization product was washed with liquefied propylene three times. Subsequently, to the product were added 0.2 g of water and 10 mL of propylene oxide, and the product was further treated at 90° C. for 15 minutes and dried under reduced pressure for 5 minutes. The treatment with propylene oxide was repeated three times, and the polymer produced was taken out. Thus, propylene homopolymer (hereinafter also referred to as "PP2a") was obtained.

(3) Production of Propylene Homopolymer Pellets 100 parts by mass of the obtained propylene homopolymer (PP2a) was mixed with 0.002 parts by mass of calcium stearate and 0.2 parts by mass of Irganox (registered trademark)-1330 (trade name, manufactured by Ciba-Geigy), followed by pelletization at 250° C. Thus, propylene homopolymer pellets (PP2) were obtained. Pelletization was carried out in the manner as in Example 1.

Production Example 3 of Propylene Homopolymer (PP3)

[Preparation of Solid Titanium Catalyst Component (a)]

952 g of anhydrous magnesium chloride, 4420 mL of decane, and 3906 g of 2-ethylhexyl alcohol were heated at 130° C. for 2 hours, thereby providing a homogenous solution. Into the solution, 213 g of phthalic anhydride was added, which was followed by further stirring and mixing at 130° C. for 1 hour so as to dissolve the phthalic anhydride.

A homogenous solution thus obtained was cooled to 23° C., and 750 mL of this homogenous solution was added dropwise over 1 hour into 2000 mL of titanium tetrachloride held at −20° C. After the dropwise addition, the temperature of the obtained mixture solution was raised to 110° C. over 4 hours. When the temperature was reached 110° C., 52.2 g of diisobutyl phthalate (DIBP) was added, and the temperature was maintained at the same level with stirring for 2 hours. Subsequently, a solid was collected by hot filtration, and the solid was resuspended in 2750 mL of titanium tetrachloride and then heated again at 110° C. for 2 hours.

After completion of the heating, a solid was collected by hot filtration again, and the solid was sufficiently washed with decane at 110° C. and hexane until a titanium compound in the wash liquid came to be not detected.

A solid titanium catalyst component (a) prepared above was stored as hexane slurry. A part of the hexane slurry was dried to study the catalyst composition. It was found that the solid titanium catalyst component (a) contained 3% by weight of titanium, 58% by weight of chlorine, 18% by weight of magnesium, and 21% by weight of DIBP.

[Preparation of Prepolymerization Catalyst]

In an autoclave having an internal volume of 10 L and equipped with a stirrer, 7 L of purified heptane, 0.16 mol of triethylaluminum, and 0.053 mol of the solid titanium catalyst component (a) obtained in the above in terms of a titanium atom were introduced, which was followed by introducing 900 g of propylene, with maintaining the temperature at not more than 5° C., reaction was carried out for 1 hour in a nitrogen atmosphere.

After completion of the polymerization, the reactor was purged with nitrogen, a supernatant liquid was removed, and the residue was washed three times using purified heptane. A prepolymerization catalyst obtained was resuspended in a purified heptane and transferred to a catalyst supply tank, and purified heptane was added in order for the solid titanium catalyst component (a) concentration to be 1 g/L. The resulting prepolymerization catalyst contained 10 g of polypropylene based on 1 g of the solid titanium catalyst component (a).

[Polymerization]

In a polymerization tank 1 having an internal volume of 140 L and equipped with a stirrer, 100 L of liquefied propylene was introduced, then with maintaining the liquid level, polymerization was carried out at 73° C. while continuously supplying liquefied propylene at 83 kg/Hr, a prepolymerization catalyst at 18 g/Hr, triethylaluminum at 47 mmol/Hr, and cyclohexyl methyl dimethoxysilane at 7 mmol/Hr. In addition, hydrogen was also supplied to maintain the concentration in the gas phase portion of the polymerization tank 1 at 0.37 mol. The proportion of the polymer production in the polymerization tank 1 (proportion of the production in the polymerization tank 1 based on the total polymer production) was 30% by weight. The resulting polymer in the form of slurry was sent to a polymerization tank 2 having an internal volume of 500 L and equipped with a stirrer.

In the polymerization tank 2, liquefied propylene was continuously supplied at 217 kg/Hr, with maintaining the liquid level at 300 L, thereby conducting polymerization at 71° C. In addition, hydrogen was also supplied to maintain the concentration in the gas phase portion of the polymerization tank 2 at 0.37% by mol. The proportion of the polymer production in the polymerization tank 2 (proportion of the production in the polymerization tank 2 based on the total polymer production) was 45% by weight. The resulting polymer in the form of slurry was sent to a polymerization tank 3 having an internal volume of 500 L and equipped with a stirrer.

In a polymerization tank 3, liquefied propylene was continuously supplied at 75 kg/Hr while maintaining the liquid level at 300 L, thereby conducting polymerization at 70° C. In addition, hydrogen was also supplied to maintain the concentration in the gas phase portion at 0.37% by mol as in the case of the polymerization tank 2. After the resulting slurry was deactivated, it was sent to a wash tank using propylene, and the polypropylene powder was washed and deashed. The proportion of the polymer production in the polymerization tank 3 (proportion of the production in the polymerization tank 3 based on the total polymer production) was 25% by weight. Thereafter, propylene was evaporated, thereby obtaining a polypropylene powder.

[Pelletization]

100 parts by weight of the resulting polypropylene resin were blended with 0.1 parts by weight of 3,5-di-t-butyl-4-hydroxytoluene, 0.2 parts by weight of tetrakis[methylene-3-(3,5-di-t-butyl-4-hydroxyphenyl)propionate]methane as the antioxidant, and 0.01 parts by weight of calcium stearate as the neutralizing agent, and thereafter, the blend was melt-kneaded at a resin temperature of 230° C. to pelletize the polypropylene resin using single screw extruder. Thus, propylene homopolymer (PP3) was obtained. A GMZ50-32 (L/D=32) single screw extruder manufactured by GM Engineering, Inc. was used.

Production Example 4 of Propylene Homopolymer (PP4)

(1) Preparation of Solid Catalyst Carrier $SiO_2$ (SUNSPHERE (registered trademark) H121 manufactured by AGC Si-Tech Co., Ltd.) in an amount of 300 g was sampled in a 1-L side-arm flask, and 800 mL of toluene was added to obtain slurry. Then, the slurry was transferred to a 5-L four mouth flask, and 260 mL of toluene was added. A methylaluminoxane (hereinafter referred to as "MAO")-toluene solution (10% by weight solution) in an amount of 2830 mL was introduced. Stirring was performed for 30 minutes at room temperature. The temperature was increased to 110° C. for 1 hour and reaction was carried out for 4 hours. After completion of the reaction, the temperature was decreased to room temperature. After cooling, the supernatant of toluene was extracted and substituted with fresh toluene until the substitution rate reached 95%.

(2) Production of Solid Catalyst (Supporting Metal Catalyst Component on Carrier)

Dimethylsilylene bis-(2-methyl-4-phenylindenyl) zirconium dichloride in an amount of 1.0 g was weighed into a 5-L four mouth flask in a glove box. The flask was taken out, 0.5 L of toluene and 2.0 L of MAO/$SiO_2$/toluene slurry prepared in the above (1) (100 g in terms of solid component) were added under nitrogen, and the carrier was allowed to support the metal catalyst component during stirring for 30 minutes. The resulting dimethylsilylene bis-(2-methyl-4-phenylindenyl)zirconium dichloride/MAO/$SiO_2$/toluene slurry was subjected to 99% substitution with n-heptane. The final slurry amount was adjusted to 4.5 L. This operation was carried out at room temperature.

(3) Preparation of Prepolymerization Catalyst

In an autoclave having an internal volume of 200 L and equipped with a stirrer, 101 g of the solid catalyst component prepared in the above (2), 111 mL of triethylaluminum, and 80 L of heptane were introduced, then with maintaining the internal temperature at 15° C. to 20° C., 303 g of ethylene was introduced, and reaction was carried out for 180 minutes with stirring. After the polymerization, a solid component was allowed to settle, a supernatant liquid was removed, and the residue was washed twice using heptane. A prepolymerization catalyst obtained was resuspended in purified heptane, and heptane was added in order for the solid catalyst component concentration to be 1 g/L. The resulting prepolymerization catalyst contained 3 g of polyethylene based on 1 g of the solid catalyst component.

(4) Polymerization

A circulation-type tubular polymerization vessel having an internal volume of 58 L and equipped with a jacket was continuously fed propylene at 30 kg/Hr, hydrogen at 5 NL/Hr, the catalyst slurry produced in the above (3), as the solid catalyst component, at 1.7 g/Hr, and triethyl aluminum at 1.0 ml/Hr, thereby allowing polymerization to proceed in the vessel filled with liquid without a gas phase. The temperature and pressure of the tubular polymerization vessel were set to 30° C. and 3.1 MPa/G, respectively.

The resulting slurry was sent to a polymerization vessel having an internal volume of 1000 L and equipped with a stirrer, and polymerization was further carried out. To the polymerization vessel, propylene was fed at 50 kg/Hr, and hydrogen was fed so that the hydrogen concentration in the gas phase portion might become 0.30% by mol. Polymerization was carried out at a polymerization temperature of 70° C. and a pressure of 3.0 MPa/G.

The resulting slurry was sent to a polymerization vessel having an internal volume of 500 L and equipped with a stirrer, and polymerization was further carried out. To the polymerization vessel, propylene was fed at 15 kg/Hr, and hydrogen was fed so that the hydrogen concentration in the gas phase portion might become 0.30% by mol. The polymerization was carried out at a polymerization temperature of 69° C. and a pressure of 2.9 MPa/G.

The resulting slurry was sent to a polymerization vessel having an internal volume of 500 L and equipped with a stirrer, and polymerization was further carried out. To the polymerization vessel, propylene was fed at 12 kg/Hr, and hydrogen was fed so that the hydrogen concentration in the gas phase portion might become 0.30% by mol. The polymerization was carried out at a polymerization temperature of 68° C. and a pressure of 2.9 MPa/G.

The resulting slurry was sent to a polymerization vessel having an internal volume of 500 L and equipped with a stirrer, and polymerization was further carried out. To the polymerization vessel, propylene was fed at 13 kg/Hr, and hydrogen was fed so that the hydrogen concentration in the gas phase portion might be 0.30% by mol. The polymerization was carried out at a polymerization temperature of 67° C. and a pressure of 2.9 MPa/G.

The resulting slurry was vaporized and then subjected to gas-solid separation to obtain a propylene homopolymer. The propylene homopolymer was obtained at 40 kg/h. The propylene homopolymer was subjected to vacuum drying at 80° C. to obtain a propylene homopolymer (PP4).

Example 1

The propylene homopolymer (MFR: 4.0 g/10 min; mmmm: 97%; ash amount: 20 ppm; chlorine amount: 1 ppm; proportion of <2,1> erythro regio defects: 0.0% by mol; Tm: 163° C., Mw/Mn: 9.0) obtained in the above Production Example 1 was blended with 200 ppm of a nonitol derivative (Millad NX8000 manufactured by Milliken & Company; melting point: 245° C.) as the α crystal nucleating agent, and the blend was melt-kneaded at 230° C. using a single screw extruder to pelletize the polypropylene for a film capacitor. GMZ50-32 (trade name, manufactured by GM Engineering, Inc., L/D=32, 50 mmφ single screw) was used as a pelletizer.

Pellets of the polypropylene for a film capacitor were melted at 250° C. and extruded by a 30-mmφ T die (manufactured by GM Engineering, Inc.), and cooled at a tensile rate of 1.0 m/min on a cooling roll maintained at 30° C. to obtain an original sheet with a thickness of 250 μm. The resulting original sheet was cut to a size of 85 mm×85 mm and biaxially stretched under the following conditions to obtain a biaxially stretched film for evaluation (film thickness: 7 μm). The results of a film obtained are set forth in Table 1.

Stretching Apparatus: KAROIV (product name) manufactured by BRUCKNER
Preheating Temperature: 154° C.
Preheating Time: 60 min
Stretch Ratio: Sequential biaxial stretching for 5×7 times (5 times in MD and 7 times in TD)
Stretching Rate: 6 m/min Examples 2 and 3

In Example 2, a film was prepared in the same manner as in Example 1, except that the addition amount of the α crystal nucleating agent was set to 500 ppm.

In Example 3, a film was prepared in the same manner as in Example 1, except that the addition amount of the α crystal nucleating agent was set to 1000 ppm.

The results of films obtained are set forth in Table 1

Example 4

A film was prepared in the same manner as in Example 1, except that the propylene homopolymer (MFR: 4.0 g/10 min; mmmm: 98%; ash amount: 20 ppm; chlorine amount: 1 ppm; proportion of <2,1> erythro regio defects: 0.0% by mol; Tm: 163° C.; Mw/Mn: 6.5) obtained in Production Example 2 above was used.

The results of a film obtained are set forth in Table 1.

Comparative Example 1

A film was prepared in the same manner as in Example 1, except that the α crystal nucleating agent was not blended. The results of a film obtained are set forth in Table 1.

Comparative Example 2

A film was prepared in the same manner as in Example 1, except that 500 ppm of an acid phosphate metal salt (ADK STAB (registered trademark) NA11 manufactured by ADEKA CORPORATION, melting point: not less than 400° C.) was blended as the nucleating agent.

The results of a film obtained are set forth in Table 1.

Comparative Example 3

A film was prepared in the same manner as in Example 1, except that 500 ppm of talc (LMS200 manufactured by Fuji Talc Industrial Co., Ltd., decomposed at 900° C.) was blended as the nucleating agent.

The results of a film obtained are set forth in Table 1.

Comparative Example 4

A film was prepared in the same manner as in Comparative Example 1, except that the propylene homopolymer obtained in the above Production Example 2 was used.

The results of a film obtained are set forth in Table 1.

Comparative Example 5

A film was prepared in the same manner as in Example 2, except that the propylene homopolymer (MFR: 3.5 g/10 min; mmmm: 92%; ash amount: 20 ppm; chlorine amount: 1 ppm; proportion of <2,1> erythro regio defects: 0.0% by mol; Tm: 160° C.; Mw/Mn: 5.5) obtained in the above Production Example 3 was used.

The results of a film obtained are set forth in Table 1.

Comparative Example 6

A film was prepared in the same manner as in Example 2, except that the propylene homopolymer (MFR: 4.2 g/10 min; mmmm: 95%; ash amount: 150 ppm; chlorine amount: less than 1 ppm; proportion of <2,1> erythro regio defects: 0.85% by mol; Tm: 148° C.; Mw/Mn: 2.8) obtained in the above Production Example 4 was used.

The results of a film obtained are set forth in Table 1.

TABLE 1

| | Item | Unit | Example 1 | Example 2 | Example 3 | Example 4 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|
| PP | PP1 (Production Example 1) | Part by weight | 100 | 100 | 100 | | 100 | 100 | 100 | | | |
| | PP2 (Production Example 2) | | | | | 100 | | | | 100 | | |
| | PP3 (Production Example 3) | | | | | | | | | | 100 | |
| | PP4 (Production Example 4) | | | | | | | | | | | 100 |
| Nucleating agent | Millad NX8000 | Part by weight | 0.02 | 0.05 | 0.10 | 0.02 | — | — | — | — | 0.05 | 0.05 |
| | ADK STAB NA11 | | — | — | — | — | — | 0.05 | — | — | — | — |
| | LMS-200 (Talc) | | — | — | — | — | — | — | 0.05 | — | — | — |
| MFR (230° C., load of 2.16 Kg) | | g/10 min | 4.0 | 4.0 | 4.0 | 4.0 | 4.0 | 4.0 | 4.0 | 4.0 | 3.5 | 4.2 |
| mmmm | | — | 0.97 | 0.97 | 0.97 | 0.98 | 0.97 | 0.97 | 0.97 | 0.98 | 0.92 | 0.95 |
| Ash amount | | ppm | 20 | 20 | 20 | 20 | 20 | 20 | 20 | 20 | 20 | 150 |
| Cl | | ppm | 1 | 1 | 1 | 1 | 1 | 1 | 1 | 1 | 1 | <1 |
| Mw/Mn | | — | 9.0 | 9.0 | 9.0 | 6.5 | 9.0 | 9.0 | 9.0 | 6.5 | 5.5 | 2.8 |
| Proportion of <2,1> erythro regio defects | | mol % | 0.0 | 0.0 | 0.0 | 0.0 | 0.0 | 0.0 | 0.0 | 0.0 | 0.0 | 0.85 |

TABLE 1-continued

| Item | Unit | Example | | | | Comparative Example | | | | | |
|---|---|---|---|---|---|---|---|---|---|---|---|
| | | 1 | 2 | 3 | 4 | 1 | 2 | 3 | 4 | 5 | 6 |
| Melting point | °C. | 163 | 163 | 163 | 163 | 163 | 163 | 163 | 163 | 160 | 148 |
| Range of temperatures available for stretching | °C. | 10 | 10 | 10 | 9 | 7 | 3 | 6 | 6 | 11 | 6 |
| 120° C. BDV | v/μm | 340 | 330 | 340 | 320 | 310 | 270 | 300 | 290 | 270 | 260 |

As shown in Examples and Comparative Examples, it is understood that the biaxially stretched film for a film capacitor of the present invention has a wide range of stretching temperatures and extremely high breakdown voltage even at a high temperature of 120° C.

The invention claimed is:

1. A polypropylene for a film capacitor, comprising a propylene homopolymer and an α crystal nucleating agent having a melting point of not more than 290° C., wherein the propylene homopolymer satisfies at least that:
   (1) the melt flow rate (MFR) is within a range of 1 to 10 (g/10 min), as determined at 230° C. under a load of 2.16 kg in accordance with JIS K 7210;
   (2) the isotactic pentad fraction (mmmm fraction) is not less than 93%, as determined using $^{13}$C-NMR;
   (3) the proportion of <2,1> erythro regio defects is less than 0.1% by mol, as determined using $^{13}$C-NMR;
   (4) the ash amount is not more than 50 ppm, as obtained by completely burning the propylene homopolymer in the air;
   (5) the chlorine amount is not more than 5 ppm, as determined by ion chromatography; and
   (6) the molecular weight distribution Mw/Mn is 6.5 to 12, as measured by gel permeation chromatography (GPC).

2. The polypropylene for a film capacitor according to claim 1, which is obtained by melt-kneading at least the propylene homopolymer and the α crystal nucleating agent.

3. The polypropylene for a film capacitor according to claim 1, wherein the α crystal nucleating agent is at least one member selected from a nonitol derivative and a sorbitol derivative.

4. The polypropylene for a film capacitor according to claim 1, wherein the amount of the α crystal nucleating agent is 1 to 2000 ppm based on 100% by weight of the propylene homopolymer.

5. A biaxially stretched film for a film capacitor, which is obtained by biaxially stretching the polypropylene for a film capacitor according to claim 1.

6. A film capacitor, comprising the biaxially stretched film for a film capacitor according to claim 5.

7. A process for producing a polypropylene for a film capacitor, comprising melt-kneading at least a propylene homopolymer satisfying the following requirements (1) to (6) and an α crystal nucleating agent having a melting point of not more than 290° C.,
   (1) the melt flow rate (MFR) is within a range of 1 to 10 (g/10 min), as determined at 230° C. under a load of 2.16 kg in accordance with JIS K 7210;
   (2) the isotactic pentad fraction (mmmm fraction) is not less than 93%, as determined using $^{13}$C-NMR;
   (3) the proportion of <2,1> erythro regio defects is less than 0.1% by mol, as determined using $^{13}$C-NMR;
   (4) the ash amount is not more than 50 ppm, as obtained by completely burning the propylene homopolymer in the air;
   (5) the chlorine amount is not more than 5 ppm, as determined by ion chromatography; and
   (6) the molecular weight distribution Mw/Mn is 6.5 to 12, as measured by gel permeation chromatography (GPC).

8. A process for producing a biaxially stretched film for a film capacitor, comprising biaxially stretching the polypropylene for a film capacitor according to claim 1.

* * * * *